(12) United States Patent
Zielinski et al.

(10) Patent No.: US 8,749,991 B2
(45) Date of Patent: Jun. 10, 2014

(54) AUDIO AMPLIFIER ASSEMBLY HAVING GROUNDING BRACKET

(75) Inventors: Eric John Zielinski, Farmington Hills, MI (US); Erik Benavides, Detroit, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1018 days.

(21) Appl. No.: 12/776,731

(22) Filed: May 10, 2010

(65) Prior Publication Data

US 2011/0274287 A1     Nov. 10, 2011

(51) Int. Cl.
*H05K 7/14* (2006.01)
*H05K 7/18* (2006.01)

(52) U.S. Cl.
USPC .......................... 361/799; 361/816; 361/818

(58) Field of Classification Search
USPC .................. 361/799, 807, 809, 810, 816, 818
See application file for complete search history.

(56) References Cited

U.S. PATENT DOCUMENTS

| 4,521,062 A | 6/1985 | Kurbikoff et al. |
| 4,842,528 A | 6/1989 | Frantz |
| 4,960,964 A | 10/1990 | Schnell et al. |
| 5,044,984 A | 9/1991 | Mosser et al. |
| 5,907,124 A | 5/1999 | Reiker |
| 5,909,012 A * | 6/1999 | Todd et al. ................... 174/266 |
| 6,335,486 B1 | 1/2002 | Reiker |
| 6,369,323 B1 | 4/2002 | Wright |
| 6,987,338 B1 | 1/2006 | Lavasser et al. |
| 7,002,524 B1 | 2/2006 | Branham |
| 7,155,026 B2 * | 12/2006 | Augustin et al. ............... 381/386 |
| 7,699,672 B2 * | 4/2010 | Zaderej et al. ................ 439/886 |
| 7,735,785 B2 * | 6/2010 | Wippler et al. .............. 248/27.1 |
| 8,113,472 B2 * | 2/2012 | Wippler et al. .............. 248/27.1 |

* cited by examiner

*Primary Examiner* — Hung S Bui
(74) *Attorney, Agent, or Firm* — Gifford, Krass, Sprinkle, Anderson & Citkowski, P.C.

(57) ABSTRACT

An audio amplifier assembly connected to an automotive vehicle media system by a wiring harness is provided. The audio amplifier assembly includes an amplifier having a chassis, an electronic module attached to the chassis, and a cover attached to the chassis to cover the electronic module. A bracket having a base portion composed of a non-conductive material and a grounding portion composed of a conductive material. The base portion being attached to the amplifier at a first end and attached to the automotive vehicle at a second end to mount the amplifier to the automotive vehicle. The grounding portion extends between the first end and the second end to provide an electrically conductive grounding path between the amplifier and the automotive vehicle.

20 Claims, 3 Drawing Sheets

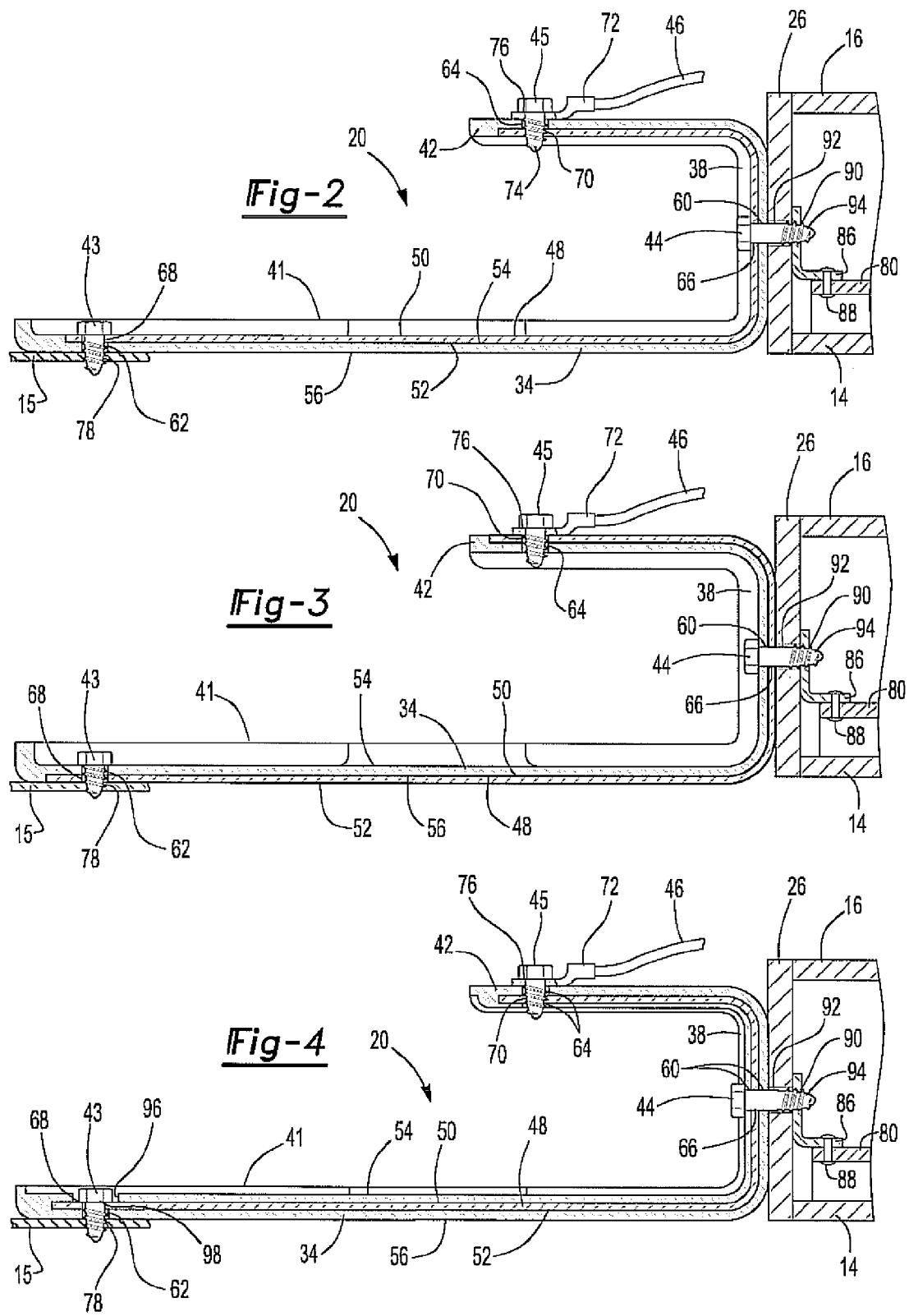

AUDIO AMPLIFIER ASSEMBLY HAVING GROUNDING BRACKET

FIELD OF THE INVENTION

The present invention relates generally to an audio amplifier assembly for an automotive vehicle. More particularly, to an audio amplifier assembly having a bracket, formed of conductive and non-conductive materials, capable of grounding and mounting an audio amplifier to the vehicle.

BACKGROUND OF THE INVENTION

Modern automotive vehicles typically include a variety of media systems including AM/FM/HD radios, DVD players, CD players, or MP3 players in order to entertain occupants of the vehicle during travel. A necessary component of these media systems is an audio amplifier which amplifies low power audio signals to a level suitable for output by a speaker system in the vehicle. As the audio amplifier includes a variety of sensitive electronics, the amplifier must be securely mounted to the vehicle and grounded in order to limit the buildup of static electricity capable of damaging the electronics contained therein.

Previous audio amplifiers utilized a metallic bracket in order to simultaneously mount the amplifier to the vehicle and also ground the electronics of the amplifier to the vehicle. A fastener attaches one end of the bracket to the amplifier and the electronics contained therein. An opposite end of the bracket is attached to the vehicle by an additional fastener. The conductive nature of the metallic bracket provides a grounding path between the two fasteners which provided a grounding path from the audio amplifier to the vehicle chassis. However, the previously known metallic brackets have a poor weight to function ratio and are significantly expensive to mass produce as different vehicle models require specific configurations of the bracket.

Further, a cover is disposed on the amplifier in order to protect the electronics housed within the amplifier from dust, debris, and other contaminants. As previous amplifiers produced a significant amount of heat during operation, the cover is typically formed of a metallic material, specifically a die cast aluminum. The metallic cover often included a plurality of heat fins allowing the cover to act as a heat sink to transfer heat away from the electronics.

However, there are numerous disadvantages associated with a metallic cover. The cover is expensive to produce and increases the overall weight of the amplifier. In addition, the metallic cover is unsightly requiring the amplifier to be hidden beneath an additional cover, typically formed of a plastic material tinted a dark color, when disposed in a location visible to an occupant. Recent advancements in electronics have reduced the amount of heat produced by the amplifier. Due to the reduction of heat produced the amplifier no longer requires a metallic cover capable of acting as a heat sink.

Thus, there exists a need for an improved audio amplifier assembly for use with an automotive vehicle capable of providing significant reductions in both weight and cost.

SUMMARY OF THE INVENTION

The present invention provides an improved audio amplifier assembly which overcomes the above-mentioned disadvantages of the previously known brackets.

In brief, an audio amplifier assembly connected to an automotive vehicle media system by a wiring harness is provided. The audio amplifier assembly includes an amplifier having a chassis, an electronic module attached to the chassis, and a cover attached to the chassis to cover the electronic module. A bracket having a base portion composed of a non-conductive material and a grounding portion composed of a conductive material is also provided. The base portion being attached to the amplifier at a first end and attached to the automotive vehicle at a second end to mount the amplifier to the automotive vehicle. The grounding portion extends between the first end and the second end to provide an electrically conductive grounding path between the amplifier and the automotive vehicle.

The base portion includes a first aperture disposed at the first end, and a second aperture disposed at the second end. A first fastener extends through the first aperture to attach the base portion to the amplifier. A second fastener extends through the second aperture to attach the base portion to the automotive vehicle. The base portion is optionally formed of a polymeric material.

The grounding portion is optionally in the form of a metallic strip having an amplifier aperture corresponding to the first aperture at the first end, and a vehicle aperture corresponding to the second aperture at said second end. The first fastener extends through the amplifier aperture to electronically connect the grounding portion to the electronic module. The second fastener extends through the vehicle aperture to electronically connect the grounding portion to the vehicle.

The grounding portion is optionally disposed on the top or bottom surface of the base portion. Further, the grounding portion is optionally partially embedded within the base portion on either the top or bottom surface. In the alternative, the grounding portion is encased within the base portion.

BRIEF DESCRIPTION OF THE DRAWINGS

A better understanding of the present invention will be had upon reference to the following detailed description when read in conjunction with the accompanying drawings, wherein like reference characters refer to like parts throughout the several views and in which:

FIG. 2 is a partial cross-sectional view taken along the lines 2-2 of FIG. 1 illustrating a second embodiment of the invention;

FIG. 3 is a partial cross-sectional view taken along the lines 2-2 of FIG. 1 illustrating a third embodiment of the invention;

FIG. 4 is a partial cross-sectional view taken along the lines 2-2 of FIG. 1 illustrating a fourth embodiment of the invention.

DETAILED DESCRIPTION OF A PREFERRED EMBODIMENT OF THE PRESENT INVENTION

The present invention has utility as an audio amplifier assembly which overcomes the above-mentioned disadvantages. The inventive amplifier assembly provides significant weight and cost reductions over the previously known amplifier assemblies by providing a bracket formed predominately of a non-conductive material. The bracket also includes a grounding portion formed of a conductive material to provide a grounding path between the audio amplifier and the automotive vehicle.

Figure 1:
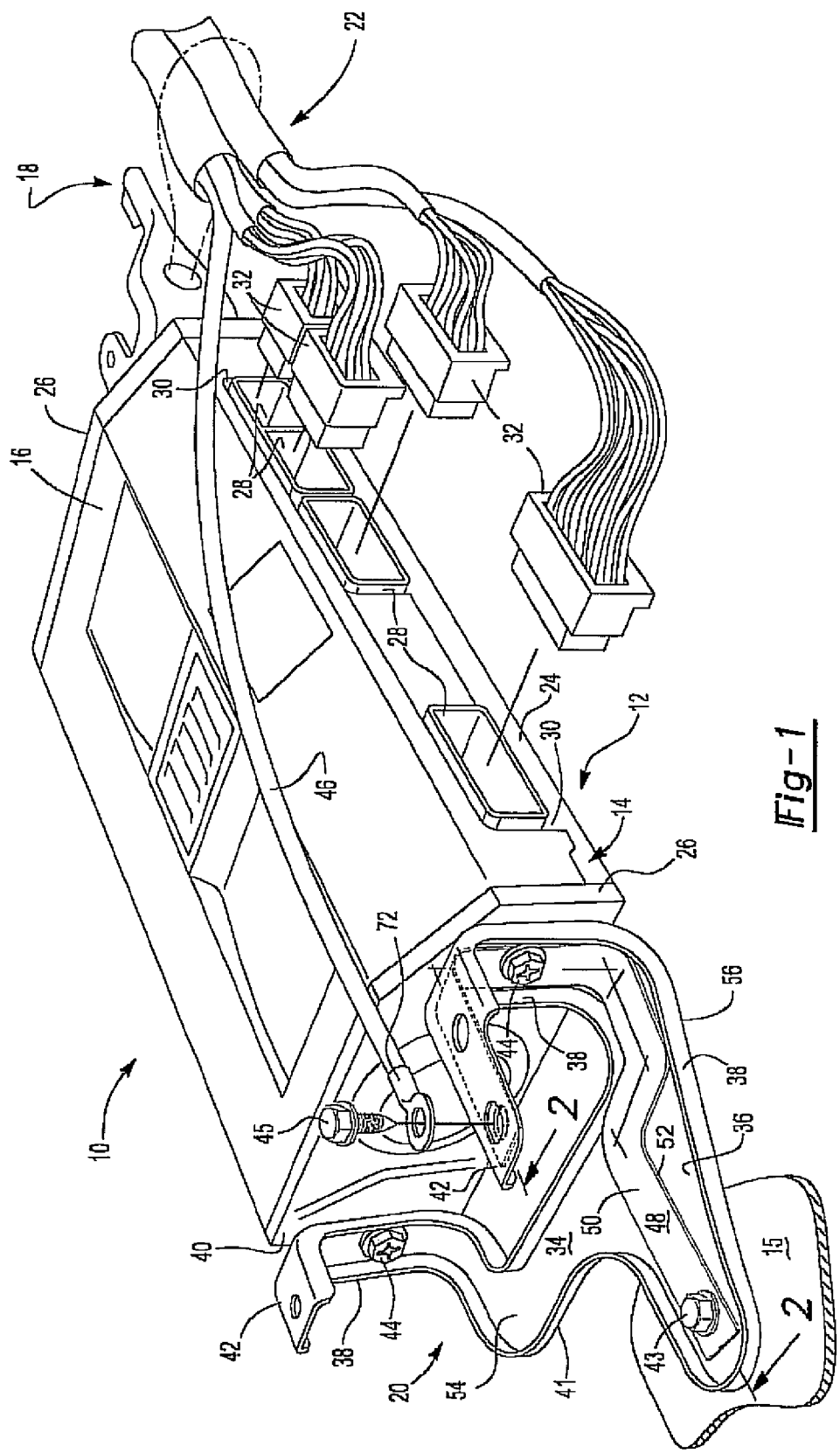
FIG. 1 is a perspective view illustrating the audio amplifier assembly connected to the automotive vehicle.

With reference to FIG. 1, an audio amplifier assembly is generally illustrated at 10. The audio amplifier assembly 10 includes an audio amplifier 12 and brackets 18 and 20 used to mount the amplifier 12 to the vehicle chassis 15. A wiring harness 22 connects the amplifier 12 to a media system contained within the automotive vehicle.

The amplifier 12 includes an amplifier chassis 14, an electronic module 80 attached to the amplifier chassis 14, as seen in FIGS. 2-4, and a cover 16. The amplifier chassis 14 includes a generally planar bottom section 24 and a pair of side walls 26 extending from the longitudinal ends of the generally planar section 24. The cover 16 attaches to the amplifier chassis 14 between the pair of side walls 26 so as to conceal and protect the electronic module 80 connected to the chassis 12.

Terminals 28 connect to the electronic module 80 and surround the input connectors (not shown) which connect the amplifier 12 to the wiring harness 22. The terminals 28 extend through cutouts 30 formed in the cover 16 to extend beyond the exterior of the amplifier 12. The wiring harness 22 includes a plurality of input and output wires 32 which are received within the terminals 28 to connect to the electronic module 80. The wires 32 input the low power audio signals from the media system and output the amplified signals to the speakers of the media system.

As stated above, the audio amplifier assembly 10 includes brackets 18 and 20 to mount the amplifier 12 to a portion of the vehicle chassis 15. Referring to the FIGS. 1 and 5, brackets 18 and 20 are positioned at opposite side walls 26 and are designed for separate functions. In the illustrated embodiment, bracket 18 is used solely for securing and mounting the amplifier 12 to the vehicle chassis 15, while bracket 20 is used for a combination of mounting and grounding the amplifier 12 to the vehicle chassis 15. However, it is appreciated, of course, that bracket 20, as described below, is optionally disposed on each of the side walls 26 of the amplifier chassis 14.

The bracket 20 is formed as a laminate having a base portion 34 and a grounding portion 48. The base portion 34 defines the overall shape of the bracket 20. The base portion 34 includes a planar section 36 in contact with the vehicle chassis 15. A pair of spaced apart tabs 38 extending generally normal to the planar section 36 contacts an exterior surface 40 of one of the pair of side wall 26. Extensions 42, used to attach a grounding wire 46 of the wiring harness 22 to the bracket 20, extend generally normally from the tabs 38. A ridge 41 extends along the perimeter of the base portion 34 to provide additional reinforcement. The base portion 34 is formed of a layer of a non-conductive material illustratively including but not limited to a plastic, polymeric, nylon, fiberglass material, or any additional material known to those of ordinary skill in the art having non-conductive properties and capable of use as a mounting bracket. The non-conductive material constituting the base portion 34 is typically lighter in weight material compared to previously known all metallic brackets.

As described in greater detail below, fasteners 43, and 44 are used to secure one end of the base portion 34 to the vehicle chassis 15, and the tabs 38 to one of the pair of side walls 26 at an opposite end of the base portion 34, thereby mounting the amplifier 12 to the vehicle chassis 15. In addition, fastener 45 is used to attach the grounding wire 46 of the wiring harness 22 the extension 42. It is appreciated that the fasteners 43, 44, and 45 include any form of bolts or screws formed of a conductive material or any other type of conductive fastener known to those of ordinary skill in the art to attach one object to another, illustratively including rivets, pegs, or nails.

The grounding portion 48 is formed of a conductive material. The grounding portion 48 is used to provide a grounding path between the amplifier 12, specifically the electronic module 80, and the vehicle chassis 15. In addition, grounding portion 48 also provides a grounding path for the grounding wire 46 of the wiring harness 22 so as to effectively ground the wiring harness 22, and the media system, to the vehicle chassis 15. In the illustrated embodiments, the grounding portion 48 extends only up one of the tabs 38 and extensions 42; however, it is appreciated that the grounding portion 48 optionally extends up both of the tabs 38 and extensions 42. The grounding portion 48 is formable in a variety of different manners and of a variety of different conductive materials including a metallic strip. The grounding portion 48 is formed of a layer of a conductive material and is provided so as to overlay the base portion 34.

Figure 5:
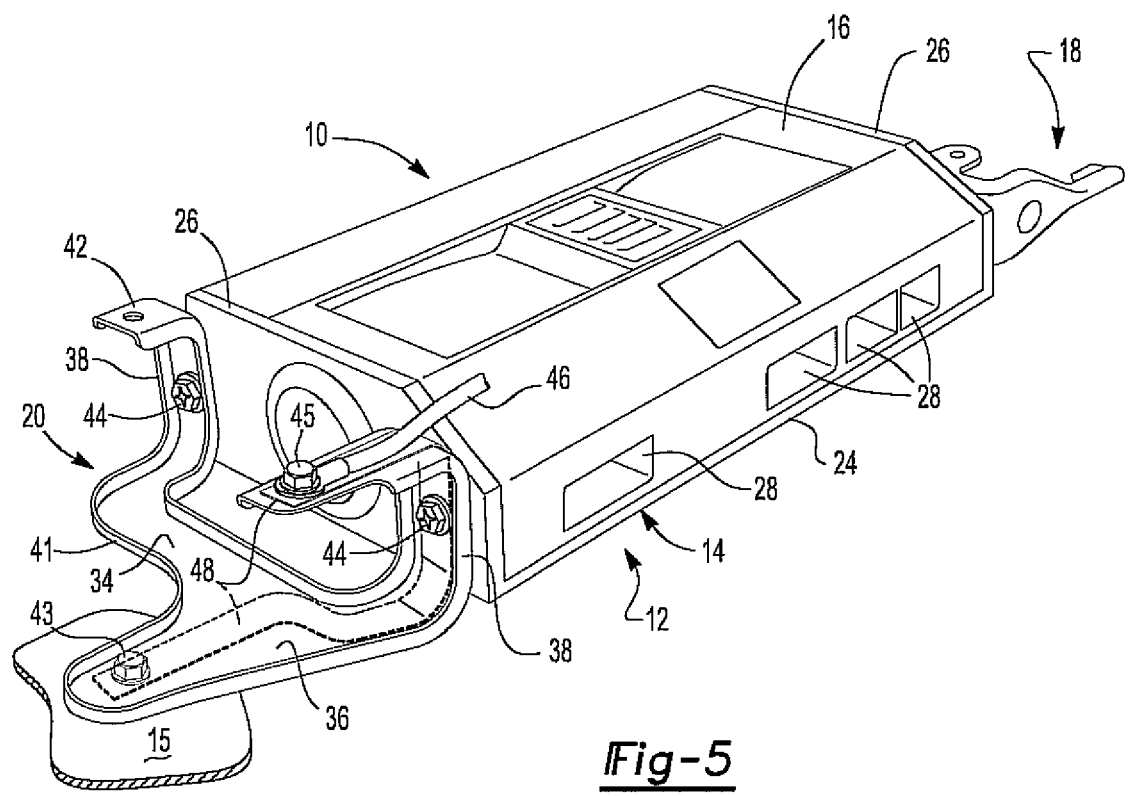
FIG. 5 is a perspective view illustrating a fifth embodiment of the amplifier assembly connected to the automotive vehicle.

As seen in FIG. 1, the grounding portion 48 includes a top surface 50 and a bottom surface 52 and has a complementary shape to a top surface 54 of the base portion 34. The grounding portion 48 is disposed on top of the base portion 34 such that the bottom surface 52 of the grounding portion 48 is in contact with the top surface 54 of the base portion 34. In the alternative, the grounding portion 48 has a shape complementary to a bottom surface 56 of the base portion 34 such that the bottom surface 52 of the grounding portion 48 is in contact with the vehicle chassis 15 and the exterior surface of one of the pair of side walls 26, and the top surface 50 of the grounding portion 48 is in contact with the bottom surface 56 of the base portion 34 as illustrated in FIG. 5.

With reference to FIGS. 2-4, alternative embodiments of the bracket 20 are illustrated. As seen in FIG. 2, the grounding portion 48 is partially embedded within the base portion 34 such that the top surface 50 of the grounding portion 48 is coplanar with the top surface 54 of the base portion 34. FIG. 3 illustrates an embodiment in which the grounding portion 48 is partially embedded within the base portion 34 such that the bottom surface 52 of the grounding portion 48 is coplanar with the bottom surface 56 of the base portion 34. This embodiment is particularly advantageous as the grounding portion 48 is in electrically conductive communication with both the vehicle chassis 15 and the amplifier 12 via the exterior surface 40 of one of the pair of side walls 26. An alternative embodiment is illustrated in FIG. 4 in which the grounding portion 48 is encased within the base portion 34.

As the base portion 34 of the bracket 20 is formed of a non-conductive material, particularly a polymeric material, the bracket 20 is particularly well suited to be formed utilizing a molding process which allows the manufacture of precisely dimensioned structures from different polymeric materials. On particular class of molding processes used to form the base portion 34 is an injection molding process. The base portion 34 of both FIGS. 1 and 5 are formed by injecting a mold having a shape of the desired base portion 34 with a molten polymeric material. Once the polymeric material has hardened, the base portion 34 is removed from the mold, the grounding portion 48 is either attached to the top surface 54 or the bottom surface 56 of the base portion 34 through the use of an adhesive or the fasteners 43, 44, and 45. The grounding portion 48 is either a preformed metallic strip having a complementary shape to the top surface 54 or the bottom surface 56 of the base portion 34, or a flexible metallic strip bent into the desired shape prior to attaching the grounding portion 48 to the base portion 34.

In regard to the embodiments illustrated in FIGS. 2-4, the bracket 20 is formed utilizing a molding process in which the grounding portion 48 is placed into the molding chamber as an insert prior to the injection of the molten polymeric material. The position of the grounding portion 48 is variable so as to provide a bracket 20 having the top surface 50 of the grounding portion 48 coplanar with the top surface 54 of the base portion 34 as seen in FIG. 2, the bottom surface 52 of the grounding portion 48 coplanar with the bottom surface 56 of the base portion 34 as seen in FIG. 3, or the grounding portion 48 encased within the base portion as seen in FIG. 4. The grounding portion 48 is formed as a separate element, such as a preformed metallic strip, or is formed during a first part of a two part molding process. In such a two part molding process, the grounding portion 48 is molded from a polymeric material having a conductive filler of sufficient quantity to provide the grounding portion 48 with conductive properties. The molded grounding portion 48 is then transferred to a molding station wherein the base portion 34 is molded embedding or encasing the grounding portion 48. The two part molding process is accomplished through the use of gates, slides, and other structures known in the art.

With reference to FIGS. 2-4, the electrically conductive grounding path between the grounding wire 46 of the wiring harness 22, the amplifier 12, and the vehicle chassis 15 will now be described. It is to be understood that the discussion of the electrically conductive grounding path provided by the grounding portion 48 that follows is identical to that of the embodiments illustrated in FIGS. 1 and 5. Specifically, the discussion of FIGS. 2 and 3 relate to FIGS. 1 and 5, respectively.

The base portion 34 includes an aperture 60 disposed at one end, specifically the tab 38, to attach the bracket 20 to the amplifier 10. An aperture 62 disposed at an opposite end of the base portion 34 is utilized to attach the bracket 20 to the vehicle chassis 15. The extension 42 of the base portion 34 includes an aperture 64 to attach the grounding wire 46 of the wiring harness 22 to the bracket 20. The grounding portion 48 includes apertures 66, 68, and 70 which correspond to apertures 60, 62 and 64 of the base portion 34, respectively.

As seen in FIGS. 2-4, the amplifier 12 includes an electronic module 80, typically a printed circuit board, which provides the function of amplifying audio signals for the media system. A conductive connector 86 is conductively attached to the electrical module 80 by a pin 88; however, it is appreciated that the connector 86 is optionally integrally formed with the electronic module 80 as a one piece construction. The connector 86 further includes an aperture 90 corresponding to an aperture 92 formed in the side wall 26 of the amplifier chassis 14. The apertures 90 and 92 correspond to the apertures 60 and 66 formed in the base portion 34 and the grounding portion 48, respectively. The fastener 44 extends through the apertures 60, 66, 90 and 92 to provide an electronically conductive grounding path between the electronic module 80 and the grounding portion 48. Specifically, a shaft 94 of the fastener 44 is in conductive contact with the connector 86, via the aperture 90, and the grounding portion 48 via the aperture 66. As seen in FIG. 3, the grounding portion 48 is in direct electrically conductive communication with the side wall 26 of the amplifier chassis 14, and, consequently, with the electronic module 80 via the connector 86.

The vehicle chassis 15 includes an aperture 78 which corresponds to the aperture 62 formed in the base portion 34 and an aperture 68 formed in the grounding portion 48. The fastener 43 extends through apertures 62 and 68 of the base portion 34 and the grounding portion 48, respectively, and enters the aperture 78 to attach the bracket 20 to the vehicle chassis 15. In addition to attaching the bracket 20 to the vehicle chassis 15, the fastener 43 also puts the grounding portion 48 in electronically conductive communication with the vehicle chassis 15.

As seen in FIG. 4, the aperture 62 formed in the base portion 34 includes an enlarged opening 96 to accommodate the head 98 of the fastener 43. The enlarged opening 96 allows the head 98, specifically the bottom surface, to be in direct contact with the grounding portion 48 and thereby direct electronically conductive communication. It is appreciated of course that the aperture 62 of the base portion is formed without the enlarged opening 96, in which the head 98 contacts the top surface 54 of the base portion.

It is appreciated, of courses, that the vehicle chassis 15 includes any portion of the automotive vehicle formed of a conductive material or any conductive support structure attached thereto. Typically, the amplifier 12 will be attached underneath a seat assembly with the fastener 43 extending into a floor portion of the vehicle chassis 15. Further, the fastener 43 is optionally a self tapping screw allowing the fastener 43 to attach to the vehicle chassis 15 without the need for an aperture 78.

As the amplifier 12, specifically the electronic module 80, is in electrically conductive communication with the grounding portion 48 which is in electrically conductive communication with the vehicle chassis 15, the amplifier 12 is grounded to the vehicle chassis 15.

The grounding wire 46 includes a conductive connecter 72, typically a ring terminal, disposed at the end thereof. The fastener 45 extends through the connecter 72 and through the aperture 64 in the base portion 34 and the aperture 70 in the grounding portion 48, thereby putting the grounding wire 46 in electronically conductive communication with the grounding portion 48. Specifically, a shaft 74 of the fastener 45 contacts the side of the aperture 70 formed in the grounding portion 48 as with the other apertures and fasteners. In addition, in the embodiments illustrated in FIGS. 3 and 5, the connecter 72 of the grounding wire 46 is compressed between a bottom surface of the head 76 of the fastener 45 and the grounding portion 48, thereby putting the connecter 72 in direct electronically conductive communication with the grounding portion 48. As the grounding wire 46 is provided with an electronically conductive grounding path to the vehicle chassis 15 via the fasteners 43 and 45 and the grounding portion 48, the wiring harness 22 and, consequently, the media system is grounded to the vehicle chassis 15.

In the illustrated embodiments, the grounding portion 48 is not limited to a metallic strip and optionally includes other configurations illustratively including, but not limited to, an electrically conductive adhesive tape having a substrate in which an electrically conductive material is disposed on a top side and an adhesive is disposed on a bottom side. The electrically conductive adhesive tape is applied to either the top surface 54 or the bottom surface 56 of the base portion 34, thereby providing an electrically conductive grounding path between the grounding wire 46, the amplifier 12, and the vehicle chassis 15. Further, it is also appreciated that the grounding portion 48 is optionally composed of an electrically conductive paint or ink type material which is either painted or printed on the top surface 54 or the bottom surface 56 of the base portion 34 in order to provide an electrically conductive grounding path.

Referring now to FIG. 5, the cover 16 of the audio amplifier assembly 10 is formed of a molded polymeric material. In particular, the cover 16 is formed of a thermoset plastic-type material which provides advantages in that the cover 16 will retain its shape upon the exposure to elevated temperatures. Further, the cover 16 is formed integrally with the terminals 28 as a one piece construction during the molding process. The integration of the cover 16 with the terminals 28 allows for the overall reduction of the number of parts and the overall cost associated with the audio amplifier assembly 10. In order to better conceal the amplifier assembly 10 when disposed in a visible location, the cover 16 is formed of a polymeric material tinted a dark color.

From the foregoing, it can be seen that the present invention provides an audio amplifier assembly having a bracket which provides a significant reduction in weight and cost. Having described the invention, however, many modifications thereto will become apparent to those skilled in the art to which it pertains without deviation from the spirit of the invention as defined by the scope of the appended claims.

It is claimed:

1. An assembly for mounting to a grounding surface, said assembly comprising:
    an electronic component having an electronic module having a connector;
    a bracket formed of a laminate having a base portion and a grounding portion, said base portion composed of a layer of a non-conductive material and said grounding portion composed of a layer of a conductive material, said grounding portion overlaying said base portion; and
    a first fastener formed of a conductive material, said first fastener mounts said bracket to said electronic component, and said first fastener connects said grounding portion to said connector, said first fastener in electronic communication with said grounding portion of said bracket and said connector of said electronic module.

2. The assembly of claim 1, wherein said base portion includes a first aperture, and wherein said base portion is attached to said electronic component by said first fastener extending through said first aperture.

3. The assembly of claim 2, wherein said base portion includes a second aperture, and wherein said base portion is attached to the grounding surface by a second fastener extending through said second aperture.

4. The assembly of claim 3, wherein said grounding portion is a metallic strip.

5. The assembly of claim 4, wherein said second portion is formed of a polymeric material.

6. The assembly of claim 5, wherein said grounding portion is embedded within said base portion such that a top surface of said grounding portion is coplanar with a top surface of said base portion.

7. The assembly of claim 5, wherein said grounding portion is embedded within said base portion such that a bottom surface of said grounding portion is coplanar with a bottom surface of said base portion.

8. The assembly of claim 5, wherein said grounding portion is encased within said base portion.

9. The assembly of claim 5, wherein a cover is formed of a thermoset plastic material.

10. The assembly of claim 9, wherein said cover includes integrally formed terminals for receiving a wiring harness.

11. The assembly of claim 3, wherein said grounding portion includes a first grounding aperture corresponding to said first aperture, and a second grounding aperture corresponding to said second aperture, and wherein said first fastener extends through said first grounding aperture to electronically connect said grounding portion to said connector of said electronic module, and said second fastener extends through said second grounding aperture to electronically connect said grounding portion to the grounding surface.

12. The assembly of claim 3, wherein said base portion includes a third aperture disposed on an extension, wherein said base portion is attached to a wiring harness by a third fastener extending through said third aperture, and wherein said grounding portion extends from said first grounding aperture to a third grounding aperture that corresponds to said third aperture to provide an electrical conductive grounding path between said wiring harness, said electronic module, and the grounding surface.

13. A bracket for mounting an electronic component to a vehicle, the vehicle having a grounding surface, the electronic component having an electronic module, the electronic module having a connector, said bracket comprising:
    a laminate having a base portion and a grounding portion, said base portion composed of a layer of a non-conductive material, said grounding portion composed of a layer of a conductive material, said grounding portion overlaying said base portion; and
    a first fastener formed of a conductive material, said first fastener mounts said bracket to the electronic module, said first fastener in electronic communication with said grounding portion of said bracket and the connector of the electronic module.

14. The bracket of claim 13, wherein said base portion includes a first aperture and a second aperture, and wherein said base portion is attached to the electronic component by said first fastener extending through said first aperture, said base portion attached to the grounding surface by a second fastener extending through said second aperture.

15. The bracket of claim 14, wherein said grounding portion includes a first grounding aperture corresponding to said first aperture, and a second grounding aperture corresponding to said second aperture, and wherein said first fastener extends through said first grounding aperture to electronically connect said grounding portion to the connector of the electronic module, and said second fastener extends through said second grounding aperture to electronically connect said grounding portion to the grounding surface.

16. The bracket of claim 15, wherein said base portion includes a third aperture disposed on an extension, wherein said base portion is attached to a wiring harness by a third fastener extending through said third aperture, and wherein said grounding portion extends from said first grounding aperture to a third grounding aperture that corresponds to said third aperture to provide an electrical conductive grounding path between said wiring harness, the electronic module, and the grounding surface.

17. The bracket of claim 13, wherein said grounding portion is embedded within said base portion such that a top surface of said grounding portion is coplanar with a top surface of said base portion.

18. The bracket of claim 13, wherein said grounding portion is embedded within said base portion such that a bottom surface of said grounding portion is coplanar with a bottom surface of said base portion.

19. The bracket of claim 13, wherein said grounding portion is encased within said base portion.

20. The bracket of claim 13, wherein said grounding portion is a metallic strip.

* * * * *